Feb. 17, 1959  E. H. SHUMAKER  2,873,538
LIQUID-TIGHT AND GAS-TIGHT ROTATING TUBULAR JOINTS
Filed July 27, 1956  2 Sheets-Sheet 1
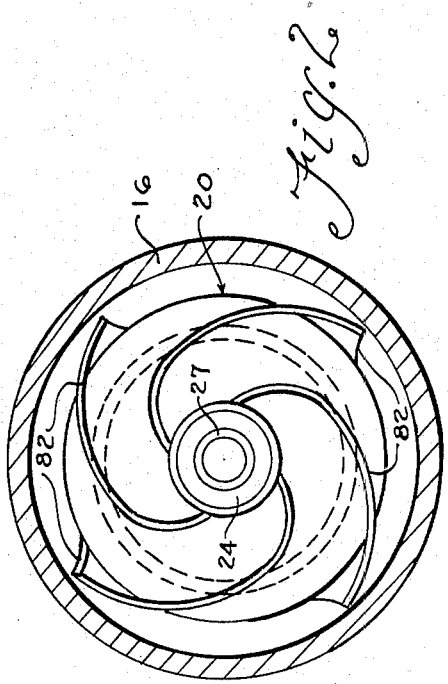
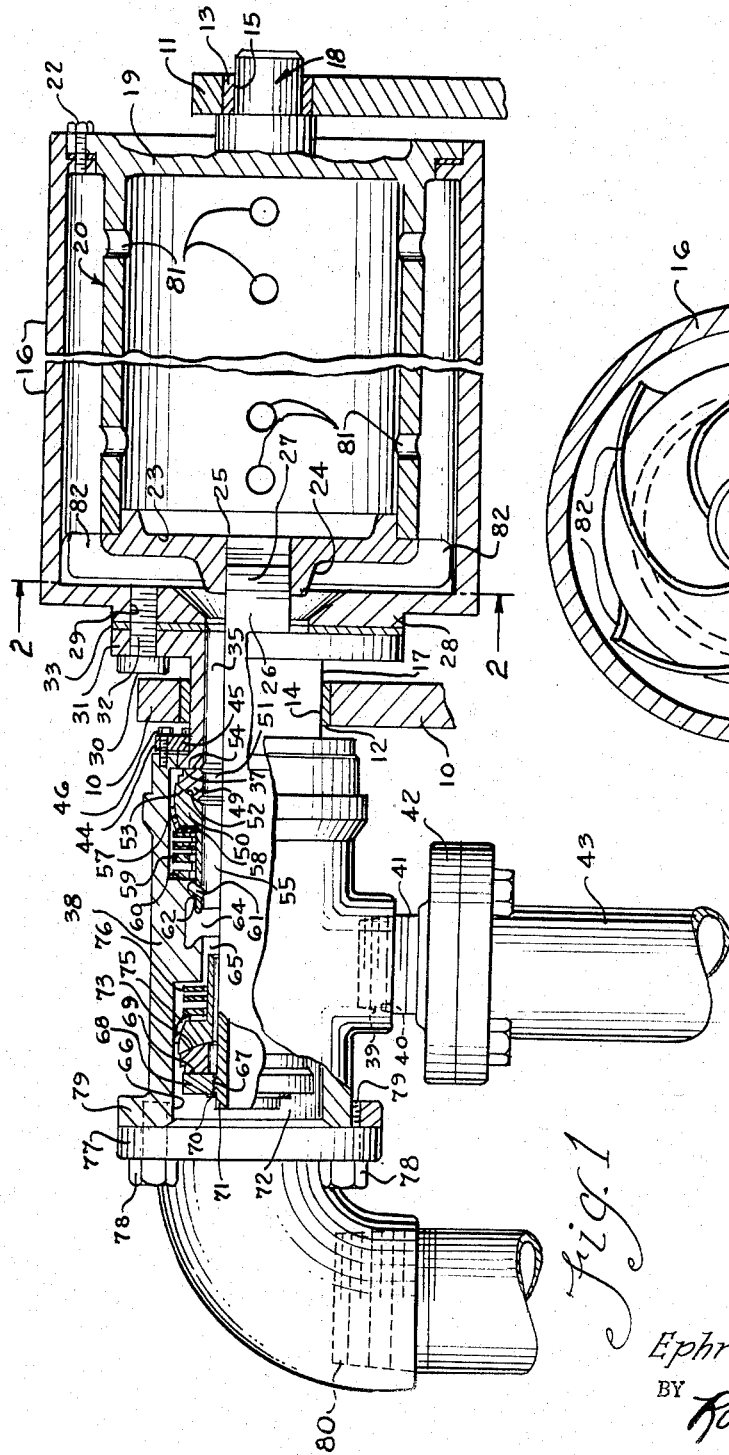
INVENTOR.
Ephraim H. Shumacker
BY Robert H. Wendt
Attorney

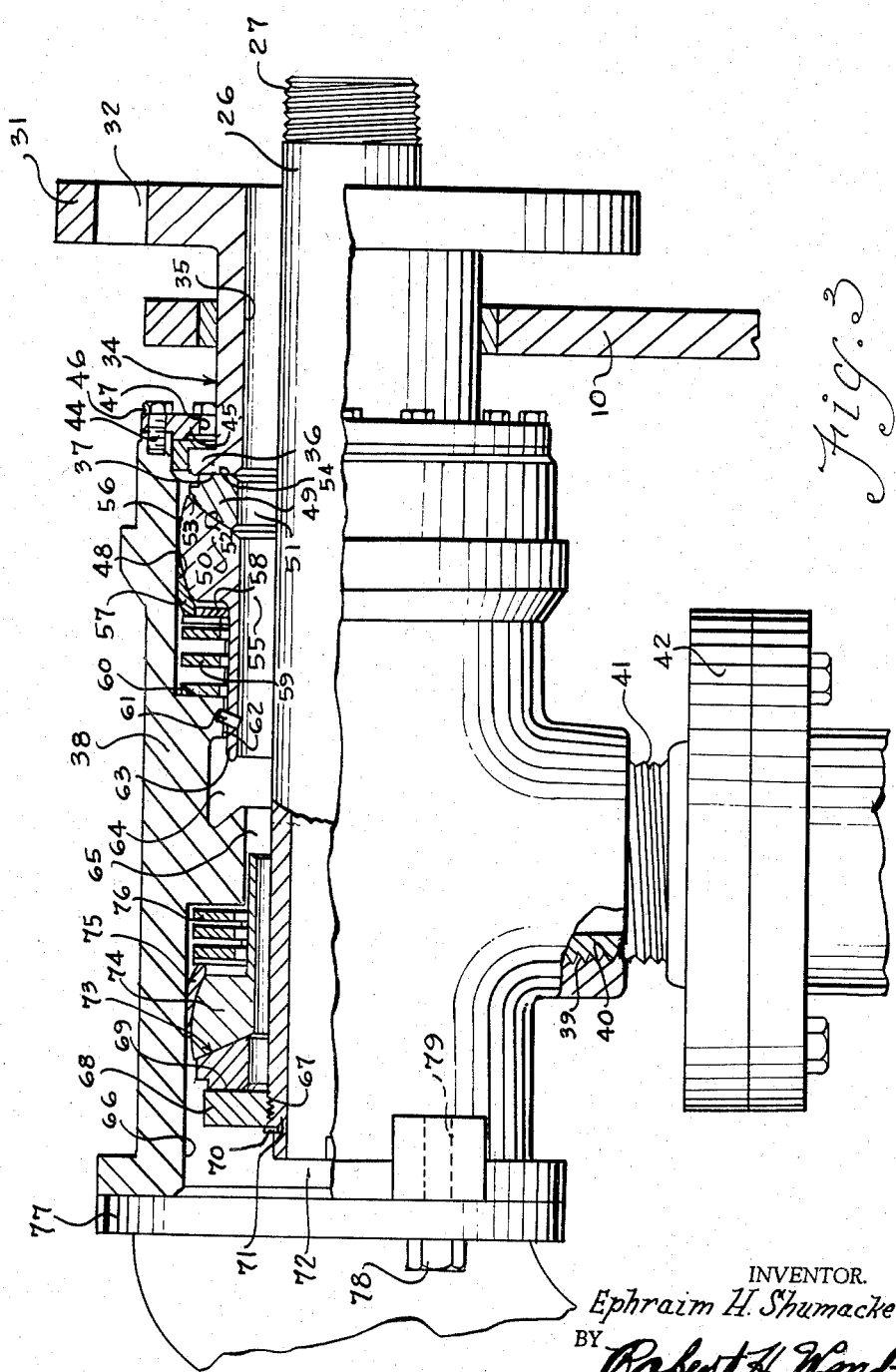

United States Patent Office

2,873,538
Patented Feb. 17, 1959

2,873,538

LIQUID-TIGHT AND GAS-TIGHT ROTATING TUBULAR JOINTS

Ephraim H. Shumaker, Sterling, Ill., assignor to Rotherm Engineering Company, Inc., Chicago, Ill., a corporation of Illinois Application July 27, 1956, Serial No. 600,466

6 Claims. (Cl. 34—124)

The present invention relates to liquid-tight and gas-tight rotating tubular joints and is particularly concerned with improvements over my prior application, Serial No. 317,692 filed October 30, 1952, on Liquid-Tight and Gas-Tight Rotating Tubular Joints, Patent No. 2,805,086.

One of the objects of the invention is the provision of an improved assembly for supplying a rotating member such as a calendering roll with super-heated steam and for carrying away from the roll the condensate resulting from the heating of the roll and condensation of the steam, in which both the pipe conveying steam and the pipe conveying condensate may be secured to the rotating parts which may be slightly out of alignment while still maintaining a liquid-tight and gas-tight joint with the fixed pipes that convey the steam and condensate.

Another object of the invention is the provision of an improved rotating joint structure for condensate pipes by means of which one end of the joint may be fixedly secured to a rotating member which may be slightly out of alignment, and the other end of the joint may be fixedly secured to a pipe or the like with a rotating joint between these members that is adapted to shift and maintain a constant liquid-tight seal.

Another object of the invention is the provision of an improved rotating liquid-tight tubular joint which permits all of these necessary movements, and which is also adapted to have its seal removed from the machine in a very short time and replaced without removing any threaded parts, thus saving the hours and minutes of stoppage which are caused when the devices of the prior art have to be repaired or replaced, since they involve the disassembly of pipe threaded members.

Another object of the invention is the provision of an improved unit connecting member which is adapted to effect a rotating liquid-tight tubular joint between a fixed pipe and a rotating pipe, even when the latter is not concentrically or coaxially located with respect to the former or with respect to the axis of rotation.

Another object is the provision of an improved device of the class described which is adapted to stand up under high temperatures, which operates with a minimum loss of pressure, and which may be manufactured economically, which is sturdy, simple, and efficient, and which may be provided with means for removing the condensate from the inside of the member that is being supplied with steam.

Another object of the invention is the provision of improved tubular rotating pipe joints which may be repaired and which may have their seals replaced without the necessity for removing the threaded pipe from the rotating part which is to receive steam or liquid, as the removal and reinstallation of a pipe provided with pipe threads frequently involves leakage unless the parts are rethreaded.

Other objects and advantages of the invention will be apparent from the following description and the accompanying drawings, in which similar characters of reference indicate similar parts throughout the several views.

Referring to the two sheets of drawing accompanying this specification,

Fig. 1 is a side elevational view of the joint assembly in partial section showing rotating tubular joints for both steam pipe and the condensate conduit;

Fig. 2 is a sectional view taken on the plane of the line 2—2 of Fig. 1.

Fig. 3 is a view in partial section on an enlarged scale, showing the structure at the left end of Fig. 1, but omitting the pipe 80.

Referring to Figs. 1 and 2, 10 and 11 indicate fixed supports provided with bearings 12 and 13 in the form of bearing sleeves mounted in suitable bores 14 and 15 in the fixed supports 10 and 11.

The bearings 12 and 13 are for rotatably supporting a calendering drum or roll 16 which is provided with trunnions 17 and 18 at its ends for rotatably supporting the calendering drum, which is to be supplied with super-heated steam, in this example, for raising its temperature to a suitable degree for operation.

I desire it to be understood that calendering rolls are only one example of the use to which the present invention may be put; and the liquid-tight joint assemblies are of general application, and may be used in many different assemblies.

The calendering roll 16 may be cylindrical in shape; and the trunnion 18 may form an integral part of, or may be bolted to, the right end of the roll 16.

An inner jacket 20 of cylindrical shape may have its end wall 21 bolted or otherwise fixedly secured to the roll 16 by screw bolts 22 threaded into threaded bores in the roll 16.

At its left end the jacket 20 has a circular end wall 23, terminating in an outlet tube 24, which is provided with integral pipe threads 25 for receiving a steam inlet pipe 26, which is externally threaded at 27, and which rotates with the jacket 20.

At its left end the cylinder 16 is provided with a thickened end wall 28 having a threaded bore 29 for receiving screw bolts 30 for clamping the joint flange 31 to the end of the cylinder 16.

Bolts 30 pass through apertures 32 in gasket 33 providing a liquid-tight joint between the flange 31 and the cylinder 16.

Flange 31 forms a part of a housing member 34, Fig. 3, which is tubular in shape and carries the flange 31 at one end. Housing member 34 may be made out of suitable metal, such as stainless steel. It is provided with through bore 35 and a radial thrust flange 36 at its other end, this flange having a perfectly plane annular thrust surface 37 which is normal to the axis of the bore 35.

Due to inaccuracies in the attachment of the flange 31 to the cylinder 16, the tubular member 34 is not necessarily axially aligned with the axis of the cylinder 16 which is one of the reasons for providing the present liquid-tight and gas-tight joint.

The joint is provided with a main housing member 38 comprising a substantially cylindrical metal member provided with a laterally turned outlet member 39 having an internally threaded outlet bore 40 for receiving the threaded tubular fitting 41 having an integral attaching flange 42.

Attaching flange 42 is provided with apertures like the apertures 32 for bolting this flange to a similar flange on a fixed pipe 43, carrying condensate away from the main housing 38.

Main housing 38 is provided at its right end with a seating surface 4 for seating a cover plate 45 which is secured to the main housing by screw bolts 46 passing through the cover plate 45 and threaded into the main housing 38.

Cover plate 45 has a central aperture 47 larger than the tubular member 34 to permit an angular movement. The cover plate 45 is spaced from the radial thrust flange 36 to permit movement between housing 38 and housing member 34 which also serves as a trunnion by virtue of its external cylindrical surface 17.

The main housing 38 has an enlarged bore 48 for receiving a floating rigid carbon graphite ring 49 and a metal follower 50 which engages the ring 49.

Ring 49 has an internal cylindrical bore 51 and has a partially spherical surface 52 on its left side. The surface 52 is convex and annular as well as partially spherical and it engages a complementary concave spherical surface 53 on the right end of the follower 50.

On its right end the carbon graphite ring 49 has a plane annular surface 54 for engaging a plane surface 37 on the thrust flange 36. The carbon graphite ring 49 floats freely between the surfaces 53 and 37 while maintaining constant contact and a liquid-tight joint.

The follower 50 comprises a tubular metal member 55 which may be made out of stainless steel and is integrally joined to the follower 50 of annular shape.

The follower 50 has an external curved surface 56, curved on a large radius and forming a tapering annular groove 57 for a wedge tubing member 58 made of suitable material, such as "Teflon."

The wedge sealing member 58 comprises a ring of "Teflon" which tapers toward a sharp edge at its right end and fits in the tapering groove 57 between the wall of bore 48 and the curved exterior 56 of the follower 50. At its left side the "Teflon" ring 58 has a plane annular surface which is engaged by one end of the coil spring 59.

Coil spring 59 is seated at 60 in the left end of bore 48 and has its right end tapered so that it may sit flatly against the left edge of the "Teflon" sealing ring 58.

The spring 59 urges the "Teflon" sealing ring 58 to the right into its tapered annular groove, which in turn urges the follower 50 toward the right into constant contact with the carbon graphite floating ring 49.

Main housing 38 has a pin 61 fixedly mounted in a bore in counter-bore 62 and sliding in a slot 63 in the end of the tubular portion 55, preventing rotation of the follower 50 but permitting it to move back and forth along the axis of the joint.

The bore in the main housing 38 is enlarged at 64 and communicates with a counter-bore 65 having a clearance with the steam inlet pipe 26.

Steam inlet pipe 26 extends into a larger counter-bore 66 and has a threaded end 67 for receiving an annular thrust member 68 of stainless steel having plane thrust surface 69 like the thrust surface 37, previously described.

The annular thrust member 68 is locked in place by a split steel ring 70 mounted in a groove 71 in the steam inlet tube 26.

Steam inlet tube 26 ends at 72 before the end of housing 38, so that the steam inlet tube has its interior in communication with bore 66, and bore 48 while bores 64 and 65 communicate with the outlet bore 40.

The thrust surfaces 69 is engaged by a carbon graphite ring 73 having a plane surface on its left side like the plane surface 54 on the carbon graphite ring 49.

The follower 74 may be identical in construction with follower 50 and is engaged by a "Teflon" sealing ring 75 which in turn is engaged by a spring 76 acting against the end of counter-bore 66.

The left end of main housing 38 is closed by an elbow plate 77, which engages a gasket and is secured by screw bolts 78 passing through bores in lugs 79 carried by the main housing 38.

Elbow plate 77 has a pipe threaded inlet 80 which may be secured to a fixed steel pipe. The course of the super-heated steam through the joint is as follows:

Steam enters at the elbow inlet 80 and is located in the bore 66 where is communicates with the end 72 of the steam inlet pipe 26. The steam is prevented from communicating with the space 65 surrounding the steam inlet pipe by the seal at the "Teflon" sealing ring 75.

The steam goes through the pipe 26 into the jacket 20 and passes out of the apertures 81 to the inside of the roll 16 where the steam heats the roll and is condensed to liquid.

The liquid is scooped up by curved baffles 82 and led to the inside of the bore 35 where it is conveyed under the pressure of the advancing steam through bore 35, bore 51, and bore 65 to the condensate outlet 40.

The action of the rotating joints are as follows in each case.

The tubular member 34 is imperfectly aligned, but the carbon graphite seal 49 follows the thrust surface 37 of this sleeve 34 and floats back and forth permitting a wobbling motion of the tube 34.

The steam inlet tube 26 is imperfectly aligned, but its thrust ring 68 engages the carbon graphite ring 69, causing it to float about while maintaing tight engagement with the follower 74. The "Teflon" seal 75 provides a liquid-tight seal between the outside of follower 74 and the inside of bore 66.

Thus, the present rotating joint includes a pair of sealed tubular members 34 and 26 which move relative to the main housing, 38, but maintain a liquid-tight and gas-tight joint with the interior of the housing 38.

It will thus be observed that I have invented an improved joint in which both the steam tube and the condensate tube may be slightly out of alignment while still maintaining a tight joint with the exterior housing.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A rotating liquid-tight and gas-tight joint assembly comprising a support provided with bearings, a steam-heated rotating member rotatably mounted on one of said bearings and having a hollow trunnion provided with a bore, said trunnion being provided at its inner end with a radially extending thrust flange having a plane surface on its end, a second rotating member rotatably mounted on one of said bearings and located in the first rotating member, said second rotating member having a tube carried by its end and located in said trunnion bore, said tube being provided at its end with a radially extending thrust flange having a plane thrust surface, a main housing comprising a substantially tubular metal member provided with a pair of counterbores, one at each end, and each counter-bore surrounding said thrust flanges and tube and having a spring seat, and said housing having a first laterally extending conduit for connection to a fixed pipe, said housing also having at the end of said tube, a closure member with a second conduit adapted to be attached to another fixed pipe, the first of said conduits being used for conveying condensate out of said rotating members, and the second of said conduits being used for conveying steam into said rotating members, a floating rigid carbon graphite annular member located in each of said counter-bores and having a plane annular surface slidably engaging each of said thrust flanges, said floating member having provided on its inner side, in each case, with an annular partially spherical surface, a metal follower member for engaging each of said floating members, the metal follower member, in each case, having a concave annular partially spherical surface engaging said floating graphite member, said follower member, in each case, having an outer curved surface forming an outwardly tapering groove between the follower member and the counter-bore, and a non-metallic, flexible, resilient, thin, wedge shaped annular sealing member located in each of said tapering grooves and engaged by a spring reacting against its seat, in each case, for establishing a liquid-tight seal between the follower and the walls of its counter-bore, in each case.

2. A rotating liquid-tight and gas-tight joint assembly comprising a support provided with bearings, a steam-heated rotating member rotatably mounted on one of said bearings and having a hollow trunnion provided with a bore, said trunnion being provided at its inner end with a radially extending thrust flange having a plane surface on its end, a second rotating member rotatably mounted on one of said bearings and located in the first rotating member, said second rotating member having a tube carried by its end and located in said trunnion bore, said tube being provided at its end with a radially extending thrust flange having a plane thrust surface, a main housing comprising a substantially tubular metal member provided with a pair of counter-bores, one at each end, and each counter-bore surrounding said thrust flanges and tube and having a spring seat, and said housing having a first laterally extending conduit for connection to a fixed pipe, said housing also having at the end of said tube, a closure member with a second conduit adapted to be attached to another fixed pipe, the first of said conduits being used for conveying condensate out of said rotating members, and the second of said conduits being used for conveying steam into said rotating members, a floating rigid carbon graphite annular member located in each of said counter-bores and having a plane annular surface slidably engaging each of said thrust flanges, said floating member having provided on its inner side, in each case, with an annular partially spherical surface, a metal follower member for engaging each of said floating members, the metal follower member, in each case, having a concave annular partially spherical surface engaging said floating graphite member, said follower member, in each case, having an outer curved surface forming an outwardly tapering groove between the follower member and the counter-bore, and a non-metallic, flexible, resilient, thin, wedge shaped annular sealing member located in each of said tapering grooves and engaged by a spring reacting against its seat, in each case, for establishing a liquid-tight seal between the follower and the walls of its counter-bore, in each case, the said springs each comprising helical springs having a substantially rectangular cross section and tapered at one end to present plane surfaces to the wedge shaped annular sealing members.

3. A rotating liquid-tight and gas-tight joint assembly comprising a support provided with bearings, a steam-heated rotating member rotatably mounted on one of said bearings and having a hollow trunnion provided with a bore, said trunnion being provided at its inner end with a radially extending thrust flange having a plane surface on its end, a second rotating member rotatably mounted on one of said bearings and located in the first rotating member, said second rotating member having a tube carried by its end and located in said trunnion bore, said tube being provided at its end with a radially extending thrust flange having a plane thrust surface, a main housing comprising a substantially tubular metal member provided with a pair of counter-bores, one at each end, and each counter-bore surrounding said thrust flanges and tube and having a spring seat, and said housing having a first laterally extending conduit for connection to a fixed pipe, said housing also having at the end of said tube, a closure member with a second conduit adapted to be attached to another fixed pipe, the first of said conduits being used for conveying condensate out of said rotating members, and the second of said conduits being used for conveying steam into said rotating members, a floating rigid carbon graphite annular member located in each of said counter-bores and having a plane annular surface slidably engaging each of said thrust flanges, said floating member having provided on its inner side, in each case, with an annular partially spherical surface, a metal follower member for engaging each of said floating members, the metal follower member, in each case, having a concave annular partially spherical surface engaging said floating graphite member, said follower member, in each case, having an outer curved surface forming an outwardly tapering groove between the follower member and the counter-bore, and a non-metallic, flexible, resilient, thin, wedge shaped annular sealing member located in each of said tapering grooves and engaged by a spring reacting against its seat, in each case, for establishing a liquid-tight seal between the follower and the walls of its counter-bore, in each case, the said follower, in each case, having an elongated inwardly extending integral tubular part slidably mounted in a complementary bore in said housing for guiding the follower into engagement with the carbon graphite floating member.

4. A rotating liquid-tight and gas-tight joint assembly comprising a support provided with bearings, a steam-heated rotating member rotatably mounted on one of said bearings and having a hollow trunnion provided with a bore, said trunnion being provided at its inner end with a radially extending thrust flange having a plane surface on its end, a second rotating member rotatably mounted on one of said bearings and located in the first rotating member, said second rotating member having a tube carried by its end and located in said trunnion bore, said tube being provided at its end with a radially extending thrust flange having a plane thrust surface, a main housing comprising a substantially tubular metal member provided with a pair of counter-bores, one at each end, and each counter-bore surrounding said thrust flanges and tube and having a spring seat, and said housing having a first laterally extending conduit for connection to a fixed pipe, said housing also having at the end of said tube, a closure member with a second conduit adapted to be attached to another fixed pipe, the first of said conduits being used for conveying condensate out of said rotating members, and the second of said conduits being used for conveying steam into said rotating members, a floating rigid carbon graphite annular member located in each of said counter-bores and having a plane annular surface slidably engaging each of said thrust flanges, said floating member having provided on its inner side, in each case, with an annular partially spherical surface, a metal follower member for engaging each of said floating members, the metal follower member, in each case, having a concave annular partially spherical surface engaging said floating graphite member, said follower member, in each case, having an outer curved surface forming an outwardly tapering groove between the follower member and the counter-bore, and a non-metallic, flexible, resilient, thin, wedge shaped annular sealing member located in each of said tapering grooves and engaged by a spring reacting against its seat, in each case, for establishing a liquid-tight seal between the follower and the walls of its counter-bore, in each case, the said follower, in each case, having an elongated inwardly extending integral tubular part slidably mounted in a complementary bore in said housing for guiding the follower into engagement with the carbon graphite floating member, and means carried by said housing for preventing rotation of the follower member relative to the housing.

5. A rotating liquid-tight and gas-tight joint assembly comprising a support provided with bearings, a steam-heated rotating member rotatably mounted on one of said bearings and having a hollow trunnion provided with a bore, said trunnion being provided at its inner end with a radially extending thrust flange having a plane surface on its end, a second rotating member rotatably mounted on one of said bearings and located in the first rotating member, said second rotating member having a tube carried by its end and located in said trunnion bore, said tube being provided at its end with a radially extending thrust flange having a plane thrust surface, a main housing comprising a substantially tubular metal member provided with a pair of counter-bores, one at each end, and each counter-bore surrounding said thrust flanges and tube and having a spring seat, and said housing having a first laterally extending conduit for connection to a fixed pipe, said housing also having at the end of said tube, a closure member with a second conduit adapted to be attached to another fixed pipe, the first of said conduits being used for conveying condensate out of said rotating members, and the second of said conduits being used for conveying steam into said rotating members, a floating rigid carbon graphite annular member located in each of said counter-bores and having a plane annular surface slidably engaging each of said thrust flanges, said floating member having provided on its inner side, in each case, with an annular partially spherical surface, a metal follower member for engaging each of said floating members, the metal follower member, in each case, having a concave annular partially spherical surface engaging said floating graphite member, said follower member, in each case, having an outer curved surface forming an outwardly tapering groove between the follower member and the counter-bore, and a non-metallic, flexible, resilient, thin, wedge shaped annular sealing member located in each of said tapering grooves and engaged by a spring reacting against its seat, in each case, for establishing a liquid-tight seal between the follower and the walls of its counter-bore, in each case, the said follower, in each case, having an elongated inwardly extending integral tubular part slidably mounted in a complementary bore in said housing for guiding the follower into engagement with the carbon graphite floating member, and means carried by said housing for preventing rotation of the follower member relative to the housing, one of said rotating members being provided with liquid lifting baffles for conveying condensate radially inward into said housing.

6. An assembly for conveying steam to a rotating cylindrical calendar roll and conveying condensate from the roll, comprising a calendar roll having an inner cylindrical housing provided with apertures to pass the steam into the calendar roll, and having an end wall carrying a trunnion and a radial attaching flange, said radial attaching flange being secured to the end of the calendar roll closing the end of said roll, said roll and inner housing having an end wall provided with spiral vanes for scooping up condensate and delivering it to a central opening in an adjacent end of the calendar roll, the adjacent end of the inner housing being closed and provided with a central threaded bore, a threaded steam tube threaded into said bore and extending with imperfect axial alignment to an open end of said steam tube, a condensate housing secured to the adjacent end of said calendar roll and surrounding said steam tube and serving as a trunnion imperfectly aligned axially with said calendar roll, a fixed frame having two bearings for rotatably mounting the trunnions of said calendar roll, said condensate tube having a radial end flange with a plane annular thrust surface, a carbon graphite ring having a plane end engaging said thrust surface, and having an annular, partially spherical, convex surface opposite to its plane surface, a metal ring having a concave, annular surface fitting against said convex surface, a tubular housing surrounding said rings, and forming a tapered annular groove adjacent said metal ring, a Teflon ring wedge shaped in cross section in said tapered groove and effecting a seal between said tubular housing and said metal ring, a spring seated against an annular shoulder in said tubular housing and urging said Teflon ring, metal ring, and graphite ring toward said thrust surface, said spring surrounding a tube integral with said metal ring, and said tube having an axial slot, a pin carried by said tubular housing and sliding in said slot, but permitting the wobbling of said tubular housing, a thrust ring carried by the end of said steam tube at its open end, a similar carbon graphite ring, a similar metal ring, and a similar Teflon ring, effecting a seal between said thrust ring and the inside of said tubular housing, and preventing the passage of steam beyond said latter seal, all of said latter rings being urged by a spring into sealing position, two fixed pipes communicating with said tubular housing, and carrying steam to said open end of said steam tube, and carrying condensate from the space about said steam tube, inside said tubular housing, the said imperfectly aligned thrust surfaces causing said carbon graphite rings to float independently of each other, while effecting a fluid seal, but permitting the independent wobbling of said steam tube and of said condensate tube, both of which are rotated by said calendar roll.

References Cited in the file of this patent
UNITED STATES PATENTS

| 951,771 | Nuttal | Mar. 8, 1910 |
| 1,180,806 | Vedder | Apr. 25, 1916 |
| 1,529,994 | Ellis | Mar. 17, 1925 |
| 2,599,346 | Offen | June 3, 1952 |

FOREIGN PATENTS

| 28,165 | Great Britain | Dec. 21, 1907 |